United States Patent
Watanabe

(10) Patent No.: US 11,133,837 B2
(45) Date of Patent: Sep. 28, 2021

(54) COMMUNICATION DEVICE

(71) Applicant: DENSO CORPORATION, Kariya (JP)

(72) Inventor: Fumio Watanabe, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/030,009

(22) Filed: Sep. 23, 2020

(65) Prior Publication Data

US 2021/0013922 A1 Jan. 14, 2021

Related U.S. Application Data

(63) Continuation of application No. PCT/JP2019/012510, filed on Mar. 25, 2019.

(30) Foreign Application Priority Data

Mar. 28, 2018 (JP) .............................. JP2018-062324

(51) Int. Cl.
*H04B 1/44* (2006.01)
*H04B 1/3822* (2015.01)

(52) U.S. Cl.
CPC ..................................... *H04B 1/44* (2013.01)

(58) Field of Classification Search
CPC ... H04B 1/04; H04B 1/16; H04B 1/38; H04B 1/3822; H04B 1/3827; H04B 1/3877; H04B 1/40; H04B 1/44; H04B 1/48; H04B 1/401; H04B 2001/0408; H03F 3/189; H03F 3/20; H03F 2200/294; H03F 2200/375; H03F 2200/451

See application file for complete search history.

(56) References Cited

U.S. PATENT DOCUMENTS

| | | | | |
|---|---|---|---|---|
| 10,321,418 | B2* | 6/2019 | Zhan | H04B 7/15535 |
| 10,374,653 | B2* | 8/2019 | Gururaj | H04B 1/44 |
| 10,439,662 | B2* | 10/2019 | Haun | H04B 1/3822 |
| 10,499,346 | B2* | 12/2019 | Sood | H04W 52/36 |
| 10,516,422 | B2* | 12/2019 | Bollmann | H04B 1/0475 |

FOREIGN PATENT DOCUMENTS

JP 2010139391 A 6/2010

* cited by examiner

*Primary Examiner* — Quochien B Vuong
(74) *Attorney, Agent, or Firm* — Harness, Dickey & Pierce, P.L.C.

(57) ABSTRACT

A communication device includes a control device and a compensation device. The control device communicates with another device using an antenna. The compensation device is connected to the control device via a first transmission line. The compensation device is connected to the antenna via a second transmission line. The compensation device compensates a loss in an RF signal bidirectionally transmitted between the control device and the antenna via the first and second transmission lines.

6 Claims, 4 Drawing Sheets

US 11,133,837 B2

COMMUNICATION DEVICE

CROSS REFERENCE TO RELATED APPLICATIONS

The present application is a continuation application of International Patent Application No. PCT/JP2019/012510 filed on Mar. 25, 2019, which designated the U.S. and claims the benefit of priority from Japanese Patent Application No. 2018-062324 filed on Mar. 28, 2018. The entire disclosures of all of the above applications are incorporated herein by reference.

TECHNICAL FIELD

The present disclosure relates to a communication device.

BACKGROUND

For example, in the United States, application of V2X is examined in legislation. V2X represents communication between vehicles (that is, vehicle-to-vehicle communication) and communication between a vehicle and infrastructure such as traffic light or road sign (that is, road-to-vehicle communication). In a V2X system, each vehicle transmits a position of the vehicle (that is, a vehicle position) around. Each vehicle may give an alarm or the like to a driver on the basis of a result of comparison between the position received from another vehicle and the vehicle position. Consequently, in the V2X system, a communication device mounted in a vehicle is required to have a communicable distance equal to or larger than a predetermined distance (for example, 300 mm).

SUMMARY

The present disclosure provides a communication device. The communication device includes a control device and a compensation device. The control device communicates with another device using an antenna. The compensation device is connected to the control device via a first transmission line. The compensation device is connected to the antenna via a second transmission line. The compensation device compensates a loss in an RF signal bidirectionally transmitted between the control device and the antenna via the first and second transmission lines.

BRIEF DESCRIPTION OF DRAWINGS

The features and advantages of the present disclosure will become more apparent from the following detailed description made with reference to the accompanying drawings. In the drawings.

DETAILED DESCRIPTION

Figure 1:
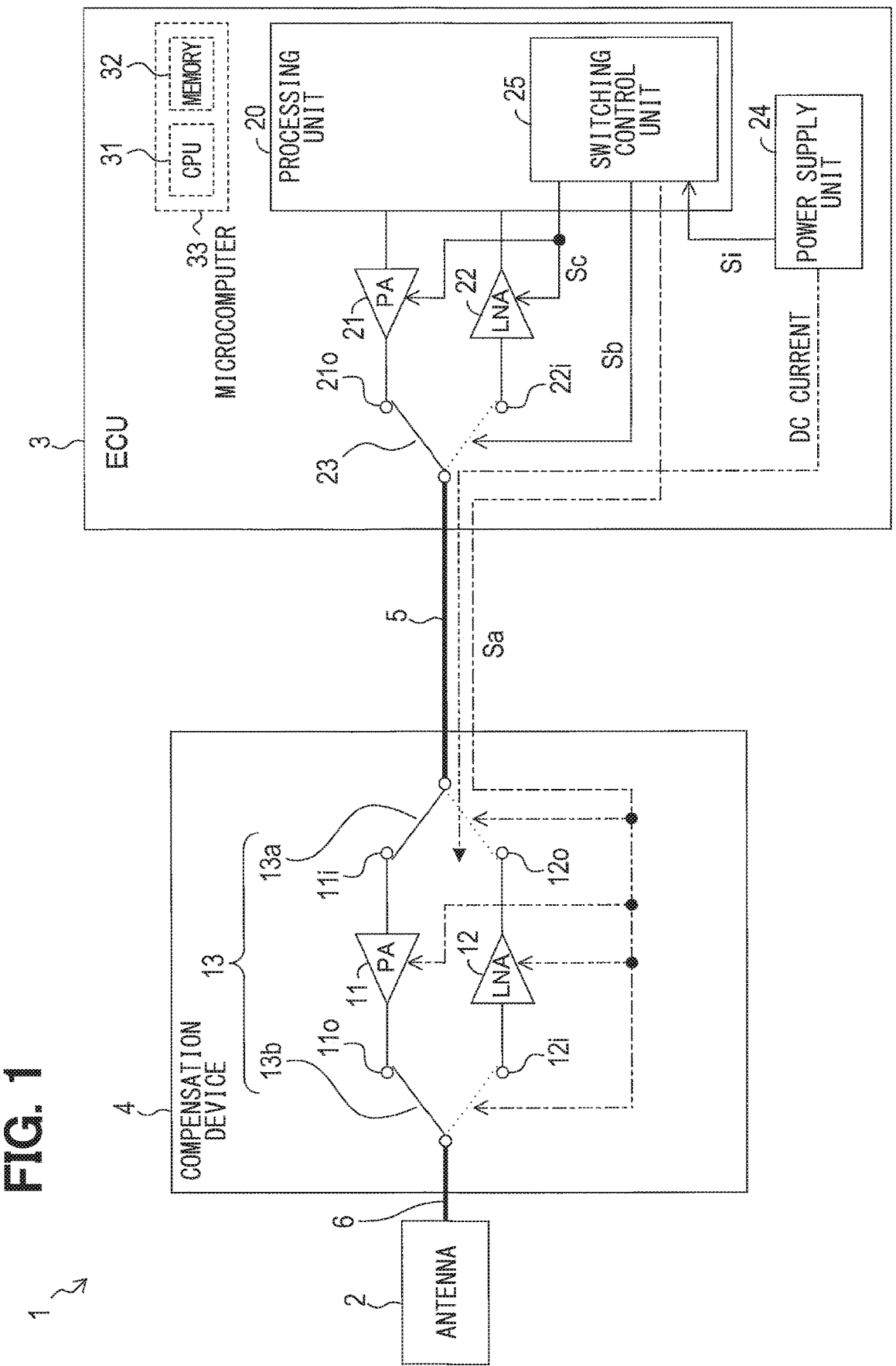
FIG. 1 is a block diagram illustrating configuration of a communication device of an embodiment.

For example, a variable gain LNA as a reception amplifier may be provided between an antenna and a GPS receiver. The variable gain LNA can maintain a level of a GPS signal supplied to the GPS receiver constant. LNA stands for low noise amplifier.

As a result of detailed examination of the inventor, the following difficulty was found out.

When a transmission line for transmitting an RF signal is long between an antenna and an in-vehicle control device or when frequency of an RF signal is high, a loss in the RF signal in the transmission line increases. Thus, the configuration makes it difficult to realize the communicable distance which is equal to or larger than predetermined distance. RF stands for radio frequency.

It is therefore considered to provide a compensation device having a transmission amplifier and a reception amplifier, as a device for compensating a loss in the RF signal, on a transmission line between the antenna and the in-vehicle control device. In this case, the transmission amplifier and the reception amplifier in the compensation device are switched and connected to the transmission line. However, when the switching is not proper, there is the possibility that a failure of the compensation device is caused.

The present disclosure provides a communication device that can suppress a failure of a compensation device for compensating a loss in an RF signal in a transmission line between an antenna and a control device.

An exemplary embodiment of the present disclosure provides a communication device. The communication device includes a control device and a compensation device. The control device communicates with another device using an antenna. The compensation device is connected to the control device via a first transmission line. The compensation device is connected to the antenna via a second transmission line. The compensation device compensates a loss in an RF signal bidirectionally transmitted between the control device and the antenna via the first and second transmission lines. The control device includes a processing unit, a first transmission amplifier, a first reception amplifier, a first switch unit, and a switching control unit. The processing unit transmits a transmission RF signal as an RF signal to be transmitted and receives a reception RF signal as an RF signal received by the antenna. The first transmission amplifier amplifies the transmission RF signal received from the processing unit. The first transmission amplifier has a signal output terminal. The first reception amplifier amplifies the reception RF signal supplied to the control device via the first transmission line and transmits the reception RF signal to the processing unit. The first reception amplifier has a signal input terminal. The first switch unit switches between a transmission connection state that connects the signal output terminal of the first transmission amplifier to the first transmission line and a reception connection state that connects the signal input terminal of the first reception amplifier to the first transmission line. The switching control unit controls at least the first switch unit. The compensation device includes a second transmission amplifier, a second reception amplifier, and a second switch unit. The second transmission amplifier amplifies the transmission RF signal supplied from the control device via the first transmission line. The second transmission amplifier has a signal output terminal and a signal input terminal. The second reception amplifier amplifies the reception RF signal supplied from the antenna via the second transmission line. The second reception amplifier has a signal output terminal and a signal input terminal. The second switch unit switches between a first state and a second state in response to a control signal transmitted from the switching control unit. The first state causes the signal input terminal of the second transmission amplifier to be connected to the first transmission line, and causes the signal output terminal of the second transmission amplifier to be connected to the second transmission line. The second state causes the signal output terminal of the second reception amplifier to be connected to the first transmission line, and causes the signal input terminal of the second reception amplifier to be connected to the second transmission line. When the processing unit switches from a reception operation state for receiving the reception RF signal to a transmission operation state for transmitting the transmission RF signal, the switching control unit causes the second switch unit to switch from the second state to the first state and then causes the first switch unit to switch from the reception connection state to the transmission connection state.

In the exemplary embodiment of the present disclosure, when the first switch unit of the control device enters the transmission connection state and the second switch unit of the compensation device enters the first state, the transmission RF signal from the processing unit is supplied to the antenna via the first transmission amplifier of the control device, the first transmission line, the second transmission amplifier of the compensation device, and the second transmission line. A loss in the transmission RF signal in the first and second transmission lines is compensated by not only the first transmission amplifier but also the second transmission amplifier.

When the first switch unit of the control device enters the reception connection state and the second switch unit of the compensation device enters the second state, the reception RF signal from the antenna is supplied to the processing unit via the second transmission line, the second reception amplifier of the compensation device, the first transmission line, and the first reception amplifier of the control device. A loss in the reception RF signal in the first and second transmission lines is compensated by not only the first reception amplifier but also the second reception amplifier.

In addition, when the processing unit switches from the reception operation state to the transmission operation state, it suppresses that a signal of strong level output from the first transmission amplifier of the control device enters the signal output terminal of the second reception amplifier in the compensation device and the second reception amplifier fails.

Hereinafter, an embodiment of the present disclosure will be described with reference to the drawings.

1. Configuration

A communication device 1 of the present embodiment illustrated in FIG. 1 is mounted in a vehicle in, for example, a V2X system. The communication device 1 includes an antenna 2, a control device (Hereinafter, ECU) 3, and a compensation device 4. ECU stands for Electronic Control Unit. The ECU 3 communicates with another device via the antenna 2. Another device includes a communication device having a configuration similar to that of the communication device 1 and mounted in another vehicle or a communication device provided for infrastructure such as a traffic light or road sign.

The compensation device 4 is provided on a transmission line between the antenna 2 and the ECU 3. Specifically, the compensation device 4 is connected to the ECU 3 via a first transmission line 5 and connected to the antenna 2 via a second transmission line 6. The compensation device 4 compensates a loss in an RF signal transmitted bidirectionally between the ECU 3 and the antenna 2 via the first and second transmission lines 5 and 6, respectively. The second transmission line 6 is shorter than the first transmission line 5. Although the first and second transmission lines 5 and 6 are coaxial cables in the present embodiment, the first and second transmission lines 5 and 6 may be provided by transmission lines or the like.

The compensation device 4 includes a power amplifier (hereinafter, referred to as PA) 11, a low noise amplifier (hereinafter, referred to as LNA) 12 and a switch unit 13.

In the compensation device 4, the PA 11 amplitudes a transmission RF signal input from the ECU 3 to the compensation device 4 via the first transmission line 5, and outputs the amplified signal. The transmission RF signal is an RF signal to be transmitted.

The LNA 12 amplifies a reception RF signal input from the antenna 2 to the compensation device 4 via the second transmission line 6 and, outputs the amplified signal. The reception RF signal is an RF signal received by the antenna 2.

The switch unit 13 includes a first switch 13a and a second switch 13b.

The first switch 13a connects the first transmission line 5 to a signal input terminal 11i of the PA 11 or a signal output terminal 12o of the LNA 12 in accordance with a control signal Sa. The control signal Sa is supplied from the ECU 3 to the compensation device 4 via the first transmission line 5.

The second switch 13b connects the second transmission line 6 to a signal output terminal 11o of the PA 11 or a signal input terminal 12i of the LNA 12 in accordance with the control signal Sa.

For example, the control signal Sa may be a signal which can distinctively indicate at least two states. In the present embodiment, the control signal Sa is a signal which indicates logic 1 or logic 0.

When the control signal Sa indicates logic 1, the first switch 13a connects the first transmission line 5 to the signal input terminal 11i of the PA 11, and the second switch 13b connects the second transmission line 6 to the signal output terminal 11o of the PA 11.

Consequently, when the control signal Sa indicates logic 1, the switch unit 13 enters a transmission state (hereinafter, referred to as a first state). In the first state, the switch unit 13 connects the first transmission line 5 to the signal input terminal 11i of the PA 11 and connects the second transmission line 6 to the signal output terminal 11o of the PA 11.

When the switch unit 13 is in the first state, a transmission RF signal supplied from the ECU 3 to the compensation device 4 via the first transmission line 5 is amplified by the PA 11 and transmitted to the antenna 2 via the second transmission line 6.

When the control signal Sa indicates logic 0, the first switch 13a connects the first transmission line 5 to the signal output terminal 12o of the LNA 12, and the second switch 13b connects the second transmission line 6 to the signal input terminal 12i of the LNA 12.

Consequently, when the control signal Sa indicates logic 0, the switch unit 13 enters a reception state (hereinafter, referred to as a second state). In the second state, the switch unit 13 connects the first transmission line 5 to the signal output terminal 12o of the LNA 12 and connects the second transmission line 6 to the signal input terminal 12i of the LNA 12.

When the switch unit 13 is in the second state, a reception RF signal supplied from the antenna 2 to the compensation device 4 via the second transmission line 6 is amplified by the LNA 12 and transmitted to the ECU 3 via the first transmission line 5.

The PA 11 operates when the control signal Sa indicates logic 1, that is, when the switch unit 13 is switched to the first state. The PA 11 stops the operation when the control signal Sa indicates logic 0, that is, when the switch unit 13 is switched to the second state.

On the contrary to the PA 11, the LNA 12 operates when the switch unit 13 is switched to the second state, and stops the operation when the switch unit 13 is switched to the first state.

The control signal Sa is output from the ECU 3 to the first transmission line 5 in a state where the control signal Sa is modulated by a signal of a frequency different from that of an RF signal used for radio communication. In the compensation device 4, the control signal Sa is extracted from the first transmission line 5 by a not-illustrated signal separation unit. The extracted control signal Sa is supplied to the switch unit 13, the PA 11, and the LNA 12.

As the control signal Sa output from the ECU 3, a control signal in which a signal for switching the state of the switch unit 13 and a signal for switching operation/non-operation of the PA 11 and LNA 12 are separated may be used.

Alternatively, the control signal Sa may be output from the ECU 3 to the compensation device 4 via a signal line which is different from the first transmission line 5.

The ECU 3 includes a processing unit 20, a PA 21, an LNA 22, a switch unit 23, and a power supply unit 24.

The processing unit 20 switches between output of the transmission RF signal and input of the reception RF signal.

The PA 21 amplifies a transmission RF signal from the processing unit 20 and outputs the amplified signal.

The LNA 22 amplifies a reception RF signal supplied to the ECU 3 via the first transmission line 5 and outputs the amplified signal to the processing unit 20.

The switch unit 23 connects the first transmission line 5 to a signal output terminal 21o of the PA 21 or a signal input terminal 22i of the LNA 22 in accordance with a control signal Sb supplied from the processing unit 20.

For example, the control signal Sb may be a signal which can distinctively indicate at least two states. In the present embodiment, the control signal Sb is a signal which indicates logic 1 or logic 0.

When the control signal Sb indicates logic 1, the switch unit 23 enters a state (hereinafter, referred to as a transmission connection state) in which the first transmission line 5 is connected to the signal output terminal 21o of the PA 21.

When the switch unit 23 is in the transmission connection state, a transmission RF signal which is output from the processing unit 20 is amplified by the PA 21 and the amplified signal is output to the first transmission line 5.

When the control signal Sb indicates logic 0, the switch unit 23 enters a state (hereinafter, referred to as a reception connection state) in which the first transmission line 5 is connected to the signal input terminal 22i of the LNA 22. When the switch unit 23 is in the reception connection state, a reception RF signal is amplified by the LNA 22 and the amplified signal is input to the processing unit 20. The reception RF signal is supplied from the antenna 2 to the ECU 3 via the compensation device 4 and the first transmission line 5.

The operation/non-operation of the PA 21 and the LNA 22 is switched according to a control signal Sc supplied from the processing unit 20.

For example, the control signal Sc may be a signal which can distinctively indicate at least two states. In the present embodiment, the control signal Sc is a signal which indicates logic 1 or logic 0.

The PA 21 operates when the control signal Sc indicates logic 1. The PA 21 stops the operation when the control signal Sc indicates logic 0.

On the contrary to the PA 21, the LNA 22 is configured to operate when the control signal Sc indicates logic 0 and to stop operation when the control signal Sc indicates logic 1.

The power supply unit 24 outputs a predetermined DC voltage to the first transmission line 5. In the compensation device 4, the DC voltage supplied from the power supply unit 24 via the first transmission line 5 is provided as a power supply voltage. That is, power for operation of the compensation device 4 is supplied from the power supply unit 24 to the compensation device 4. Consequently, DC current corresponding to consumption current in the compensation device 4 flows from the power supply unit 24 to the first transmission line 5. In the following, the DC current will be simply called current.

The processing unit 20 is also provided with a switching control unit 25.

The switching control unit 25 outputs the control signal Sa to the compensation device 4, the control signal Sb to the switch unit 23, and the control signal Sc to the PA 21 and LNA 22. A current detection signal Si is supplied from the power supply unit 24 to the switching control unit 25. The current detection signal Si is a signal indicating the value of current flowing from the power supply unit 24 to the compensation device 4 via the first transmission line 5.

Since the control signals Sb and Sc are switched to the same logic value, the control signals Sb and Sc may not be the separate signals but may be one signal which is commonly used.

The processing unit 20 may be realized by a digital circuit or an analog circuit or a combination of digital and analog circuits. As indicated by dotted lines in FIG. 1, the processing unit 20 may be realized by using one or more microcomputers 33 each having a CPU 31 and a semiconductor memory 32 such as a RAM or ROM. In this case, the function of the processing unit 20 is realized when the CPU 31 executes a program stored in a non-transitory tangible storage medium. In this example, the semiconductor memory 32 corresponds to a non-transitory tangible storage medium that stores a program. By executing the program, a method corresponding to the program is executed. Alternatively, the switching control unit 25 may be provided separately from the processing unit 20.

2. Processes

Next, processes executed by the switching control unit 25 will be described by using the flowcharts of FIGS. 2 and 3 and the time chart of FIG. 4.

Hereinafter, as modes of the compensation device 4, a mode in which the switch unit 13 is in the first state, the PA 11 operates, and the LNA 12 stops operation will be called a transmission mode, and a mode in which the switch unit 13 is in the second state, the LNA 12 operates, and the PA 11 stops operation will be called a reception mode.

As modes of the ECU 3, a mode in which the switch unit 23 is in the transmission connection state, the PA 21 operates, and the LNA 22 stops operation will be called a transmission mode, and a mode in which the switch unit 23 is in the reception connection state, the LNA 22 operates, and the PA 21 stops operation will be called a reception mode.

(2-1. Transmission Switching Process)

Figure 2:
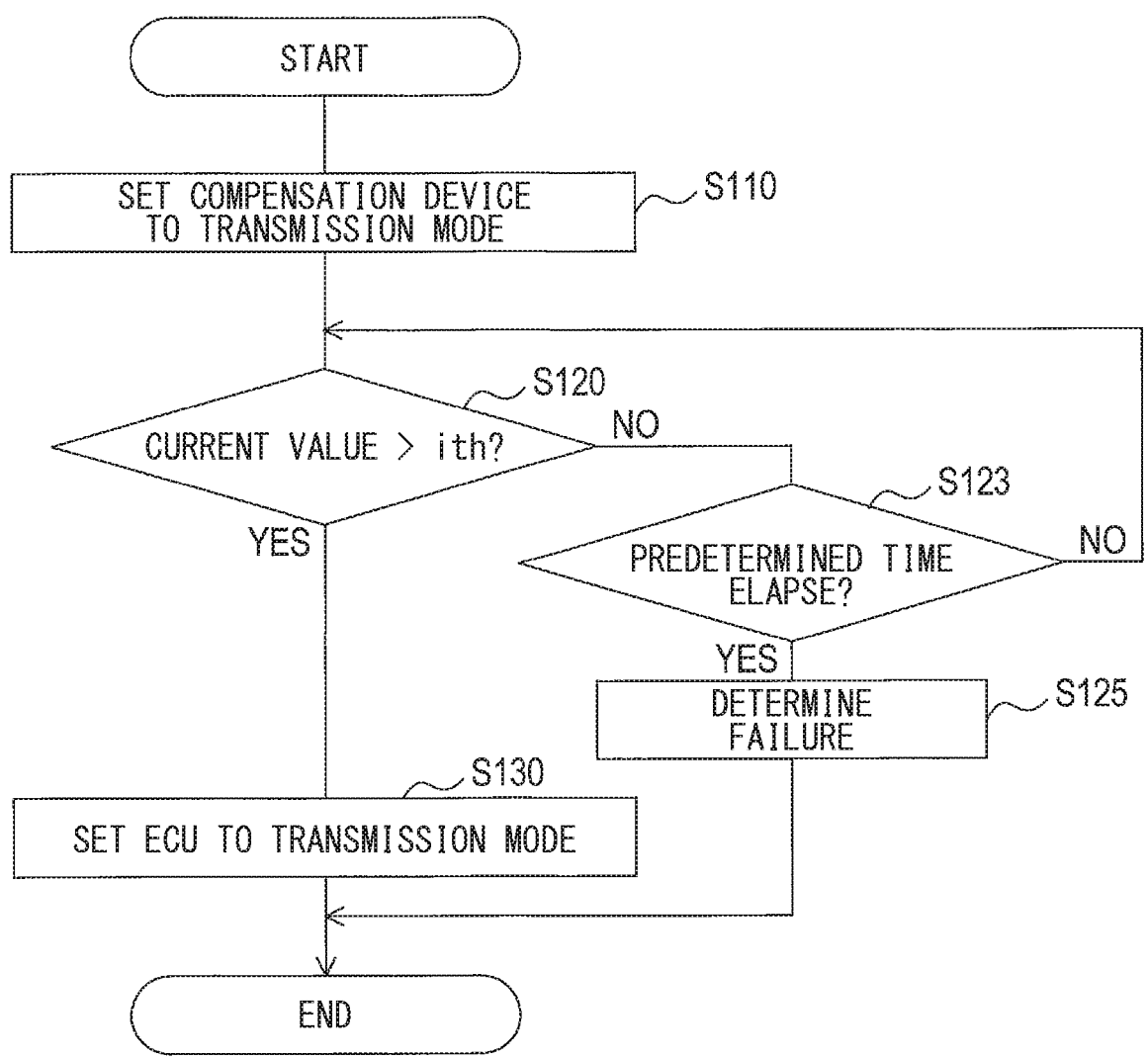
FIG. 2 is a flowchart of transmission switching process.

The switching control unit 25 performs a transmission switching process illustrated in FIG. 2 when the processing unit 20 switches from the reception operation state of receiving the reception RF signal to the transmission operation state of outputting the transmission RF signal. The transmission switching process is executed before the processing unit 20 starts outputting the transmission RF signal.

As illustrated in FIG. 2, when the transmission switching process starts, the switching control unit 25 causes the compensation device 4 to switch from the reception mode to the transmission mode in S110. Specifically, as illustrated at time t1 in FIG. 4, the switching control unit 25 switches the control signal Sa transmitted to the compensation device 4 from logic 0 to logic 1.

In the following S120, the switching control unit 25 determines whether the value of current supplied from the power supply unit 24 to the compensation device 4 (that is, consumption current of the compensation device 4) is larger than a predetermined value ith or not on the basis of the above-described current detection signal Si.

Figure 4:
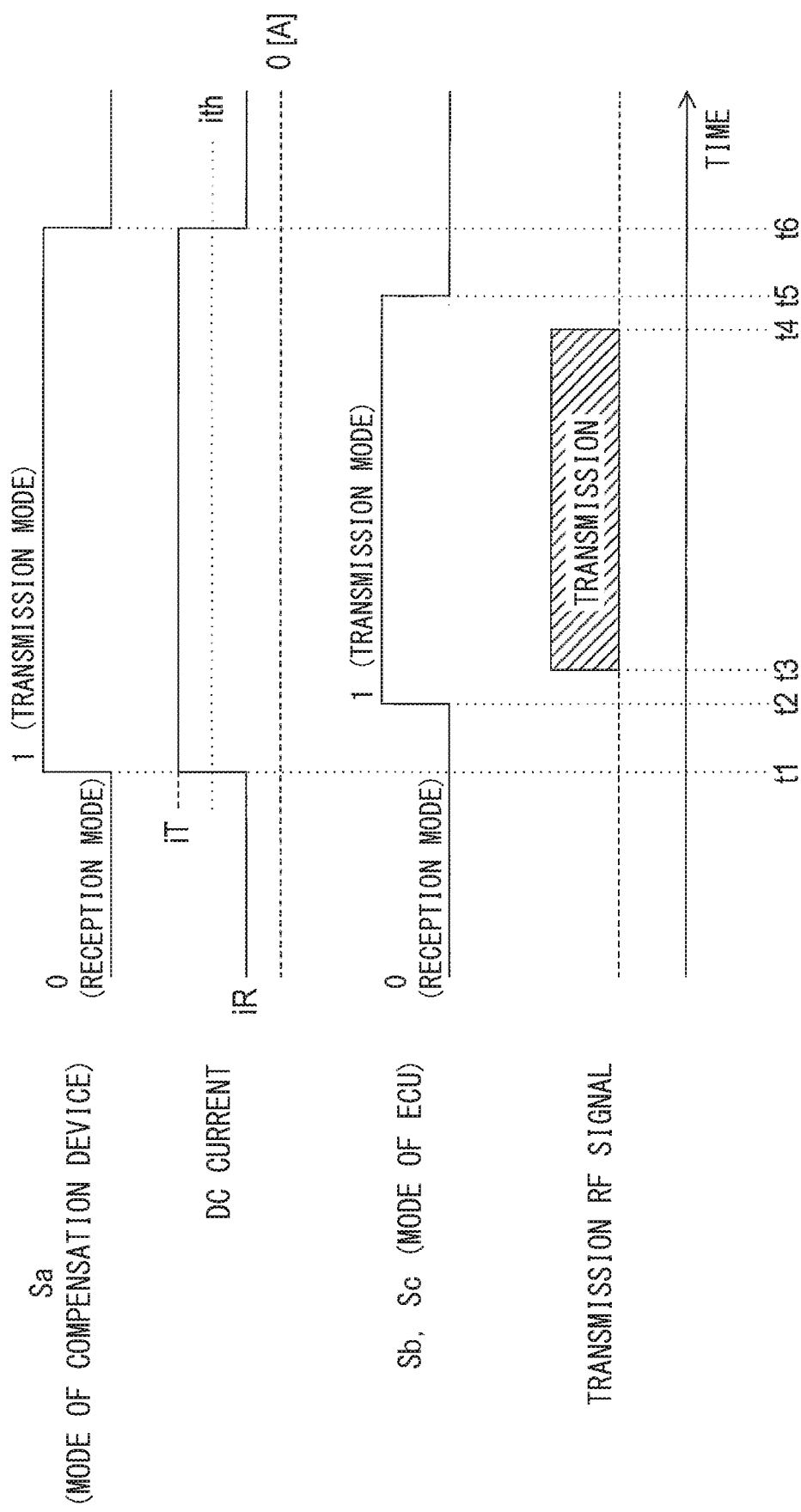
FIG. 4 is a time chart illustrating the transmission switching process and the reception switching process.

As illustrated in FIG. 4, when the consumption current value in the transmission mode of the compensation device 4 is defined as iT and the consumption current value in the reception mode of the compensation device 4 is defined as iR, the predetermined value ith is set to a value between the values iR and iT. Generally, the consumption current value of the PA is larger than that of the LNA, so that the value iT is larger than the value iR. The difference between the consumption current value of the LNA 21 and that of the PA 11 appears as the difference between the values iR and iT. That is, in S120, the switching control unit 25 determines whether the compensation device 4 switches from the reception mode to the transmission mode on the basis of the value of current flowing from the power supply unit 24 to the compensation device 4.

When it is determined in the above-described S120 that the value of the current flowing in the compensation device 4 is larger than the predetermined value ith, in the following S130, the switching control unit 25 switches the ECU 3 from the reception mode to the transmission mode. Specifically, as illustrated at time t2 in FIG. 4, the switching control unit 25 switches the control signal Sb transmitted to the switch unit 23 and the control signal Sc transmitted to the PA 21 and the LNA 22 from logic 0 to logic 1.

After that, as illustrated at time t3 in FIG. 4, the transmission RF signal is output from the processing unit 20 to the PA 21. The transmission RF signal amplified by the PA 21 is input to the compensation device 4 via the first transmission line 5 and amplified by the PA 11, and then the amplified signal is transmitted to the antenna 2 via the second transmission line 6.

When it is determined in the above-described S120 that the value of current flowing in the compensation device 4 is not larger than the predetermined value ith, the switching control unit 25 advances to S123. In S123, the switching control unit 25 determines whether or not predetermined time has lapsed since the switching to the transmission mode of the compensation device 4 is executed in S110. When the predetermined time has not lapsed, the process returns to S120.

When it is determined in S123 that the predetermined time has lapsed, that is, when it is determined that the value of current is not larger than the predetermined value ith after lapse of predetermined time since the switching to the transmission mode of the compensation device 4 is executed, the switching control unit 25 advances to S125. The switching control unit 25 determines in S125 a fault in the compensation device 4, and then finishes the transmission switching process and performs predetermined fail-safe process.

(2-2. Reception Switching Process)

Figure 3:
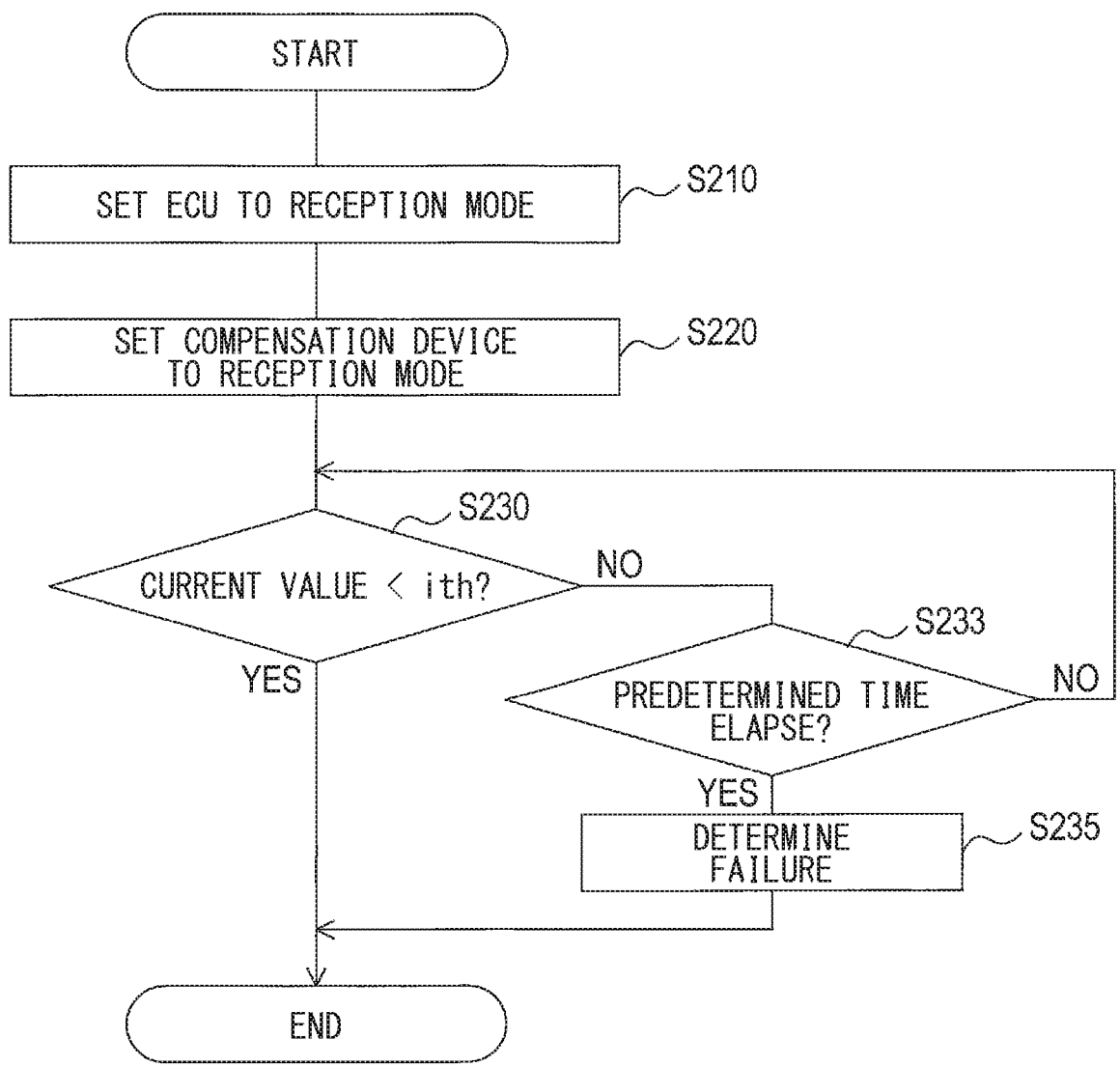
FIG. 3 is a flowchart of reception switching process.

When the processing unit 20 is switched from the transmission operation state to the reception operation state, the switching control unit 25 performs the reception switching process illustrated in FIG. 3. As illustrated at time t4 in FIG. 4, when the processing unit 20 stops outputting the transmission RF signal, the switching control unit 25 starts the reception switching process of FIG. 3.

As illustrated in FIG. 3, when the reception switching process is started, the switching control unit 25 switches the ECU 3 from the transmission mode to the reception mode in S210. Specifically, as illustrated at time t5 in FIG. 4, the switching control unit 25 switches the control signal Sb transmitted to the switch unit 23 and the control signal Sc transmitted to the PA 21 and the LNA 22 from logic 1 to logic 0.

In the following S220, the switching control unit 25 switches the compensation device 4 from the transmission mode to the reception mode. Specifically, as illustrated at time t6 in FIG. 4, the switching control unit 25 switches the control signal Sa transmitted to the compensation device 4 from logic 1 to logic 0.

The switching control unit 25 determines whether the value of current flowing from the power supply unit 24 to the compensation device 4 is smaller than the predetermined value ith on the basis of the above-described current detection signal Si in the following S230. When it is determined that the value of current is smaller than the predetermined value ith, the switching control unit 25 terminates the reception switching process.

When the ECU 3 and the compensation device 4 enter the reception mode, the reception RF signal transmitted from the antenna 2 is supplied to the processing unit 20 via the second transmission line 6, the LNA 12 of the compensation device 4, the first transmission line 5, and the LNA 22 of the ECU 3.

On the other hand, when it is determined in the above-described S230 that the value of current flowing in the compensation device 4 is not smaller than the predetermined value ith, the switching control unit 25 advances to S233. The switching control unit 25 determines in S233 whether or not predetermined time has lapsed since the switching to the reception mode of the compensation device 4 is executed in S220. When the predetermined time has not lapsed, the switching control unit 25 returns to S230.

When it is determined in the above-described S233 that the predetermined time has lapsed, that is, when it is determined that the value of current is not smaller than the predetermined value ith after the predetermined time has lapsed since the switching to the reception mode of the compensation device 4 is executed, the switching control unit 25 advances to S235. The switching control unit 25 determines, in S235, occurrence of fault in the compensation device 4, and then the switching control unit 25 terminates the reception switching process, and executes predetermined fail-safe process.

3. Effects

According to the present embodiment specifically described above, the following effects are produced.

(3-1) When the processing unit 20 switches from the reception operation state to the transmission operation state, the switching control unit 25 of the ECU 3 switches the compensation device 4 to the transmission mode and, after that, switches the ECU 3 to the transmission mode by the processes in FIG. 2. Therefore, the switch unit 13 of the compensation device 4 is switched from the second state to the first state and, after that, the switch unit 23 of the ECU 3 is switched from the reception connection state to the transmission connection state.

Consequently, in the case where the processing unit 20 switches to the transmission operation state, the malfunction of the LNA 12 caused by a signal of strong level output from the PA 21 in the ECU 3 entering the signal output terminal 12o of the LNA 12 in the compensation device 4 is suppressed.

(3-2) When the processing unit 20 switches from the transmission operation state to the reception operation state, by the processes in FIG. 3, the switching control unit 25 switches the ECU 3 to the reception mode and, after that, switches the compensation device 4 to the reception mode. Therefore, the switch unit 23 of the ECU 3 is switched from the transmission connection state to the reception connection state and, after that, the switch unit 13 of the compensation device 4 is switched from the first state to the second state.

Consequently, also in the case where the processing unit 20 switches to the reception operation state, the malfunction of the LNA 12 caused by a signal of strong level output from the PA 21 in the ECU 3 enters the signal output terminal 12o of the LNA 12 in the compensation device 4 is suppressed.

(3-3) The PA 11 of the compensation device 4 operates in the case where the switch unit 13 is switched to the first state for transmission, and stops operation in the case where the switch unit 13 is switched to the second state for reception. On the contrary, the LNA 12 of the compensation device 4 operates in the case where the switch unit 13 is switched to the second state, and stops operation in the case where the switch unit 13 is switched to the first state. Consequently, each of the PA 11 and the LNA 12 operates as necessary, and consumption power of the compensation device 4 can be suppressed.

(3-4) The power for operation is supplied from the power supply unit 24 of the ECU 3 to the compensation device 4. Consequently, it is unnecessary to provide the compensation device 4 with the power supply unit 24. Therefore, the compensation device 4 can be easily miniaturized.

(3-5) In the processes of FIG. 2, the switching control unit 25 switches the compensation device 4 to the transmission mode in S110 and, after that, determines whether or not the value of current flowing from the power supply unit 24 to the compensation device 4 is larger than the predetermined value ith in S120. When it is determined that the value of current flowing in the compensation device 4 is larger than the predetermined value ith, the switching control unit 25 switches the ECU 3 to the transmission mode in S130. Consequently, after determined that the compensation device 4 is switched to the transmission mode, the ECU 3 can be switched to the transmission mode.

(3-6) In the processes of FIG. 3, the switching control unit 25 switches the compensation device 4 from the transmission mode to the reception mode in S220 and, after that, determines whether or not the value of current flowing from the power supply unit 24 to the compensation device 4 is smaller than the predetermined value ith in S230. When it is determined in S230 and S233 that the value of current flowing in the compensation device 4 is not smaller than the predetermined value ith even predetermined time has lapsed since the switching to the reception mode of the compensation device 4 is executed, the switching control unit 25 determines a fault in the compensation device 4. Consequently, after detecting abnormality of the compensation device 4, fail-safe can be performed.

The predetermined value ith used for the determination of S230 in FIG. 3 corresponds to a predetermined value. The predetermined value ith used for the determination of S230 in FIG. 3 and the predetermined value ith used for the determination of S120 in FIG. 2 may be set to different values as long as they are values between the above-described iR and iT.

The output levels or gains of the PAs 11 and 21 and the LNAs 12 and 22 may be controlled by, for example, the processing unit 20.

In the present embodiment, the PA 21 corresponds to a first transmission amplifier, the LNA 22 corresponds to a first reception amplifier, and the switch unit 23 corresponds to a first switch unit. The PA 11 corresponds to a second transmission amplifier, the LNA 12 corresponds to a second reception amplifier, and the switch unit 13 corresponds to a second switch unit.

4. Other Embodiments

Although the present embodiment of the present disclosure has been described above, the present disclosure can be variously modified without being limited to the above-described embodiment.

For example, the antenna 2 and the compensation device 4 may be configured as one antenna module. In this case, in the antenna module, the transmission line 6 connecting the antenna 2 and the second switch 13b of the switch unit 13 corresponds to a second transmission line.

A plurality of functions of one component in the present embodiment may be realized by a plurality of components, and one function of one component may be realized by a plurality of components. A plurality of functions of a plurality of components may be realized by one component, and one function realized by a plurality of components may be realized by one component. A part of the configuration of the present embodiment may be omitted.

The present disclosure can be realized by, other than the above-described communication device 1, various forms such as a system using the communication device 1 as a component, a program for making a computer function as the ECU 3 in the communication device 1, a non-transitory tangible storage medium such as a semiconductor memory in which the program is recorded, and a connection switching method in a communication device.

What is claimed is:
1. A communication device comprising:
a control device configured to communicate with another device using an antenna; and
a compensation device connected to the control device via a first transmission line, connected to the antenna via a second transmission line, and configured to compensate a loss in an RF signal bidirectionally transmitted between the control device and the antenna via the first and second transmission lines, wherein
the control device includes
a processing unit configured to transmit a transmission RF signal as an RF signal to be transmitted and receive a reception RF signal as an RF signal received by the antenna,
a first transmission amplifier configured to amplify the transmission RF signal received from the processing unit, wherein the first transmission amplifier has a signal output terminal, a first reception amplifier configured to amplify the reception RF signal transmitted to the control device via the first transmission line and transmit the reception RF signal to the processing unit, wherein the first reception amplifier has a signal input terminal, a first switch unit configured to switch between a transmission connection state that connects the signal output terminal of the first transmission amplifier to the first transmission line and a reception connection state that connects the signal input terminal of the first reception amplifier to the first transmission line, and a switching control unit configured to control at least the first switch unit, the compensation device includes a second transmission amplifier configured to amplify the transmission RF signal received from the control device via the first transmission line, wherein the second transmission amplifier has a signal output terminal and a signal input terminal, a second reception amplifier configured to amplify the reception RF signal received from the antenna via the second transmission line, wherein the second reception amplifier has a signal output terminal and a signal input terminal, and a second switch unit configured to switch between a first state and a second state in response to a control signal transmitted from the switching control unit, wherein the first state causes the signal input terminal of the second transmission amplifier to be connected to the first transmission line and causes the signal output terminal of the second transmission amplifier to be connected to the second transmission line, and the second state causes the signal output terminal of the second reception amplifier to be connected to the first transmission line and causes the signal input terminal of the second reception amplifier to be connected to the second transmission line, and when the processing unit switches from a reception operation state for receiving the reception RF signal to a transmission operation state for transmitting the transmission RF signal, the switching control unit causes the second switch unit to switch from the second state to the first state and then causes the first switch unit to switch from the reception connection state to the transmission connection state.

2. The communication device according to claim 1, wherein when the processing unit switches from the transmission operation state to the reception operation state, the switching control unit causes the first switch unit to switch from the transmission connection state to the reception connection state and then causes the second switch unit to switch from the first state to the second state.

3. The communication device according to claim 1, wherein the second transmission amplifier operates when the second switch unit switches to the first state, and stops operation when the second switch unit switches to the second state, and the second reception amplifier operates when the second switch unit switches to the second state, and stop operation when the second switch unit switches to the first state.

4. The communication device according to claim 3, wherein the control device further includes a power supply unit configured to supply power to the compensation device.

5. The communication device according to claim 4, wherein when the processing unit switches from the reception operation state to the transmission operation state, the switching control unit determines whether a value of current flowing from the power supply unit to the compensation device is larger than a predetermined value after causing the second switch unit to switch from the second state to the first state, and when the switching control unit determines that the value of current is larger than the predetermined value, the switching control unit causes the first switch unit to switch from the reception connection state to the transmission connection state.

6. The communication device according to claim 4, wherein when the processing unit switches from the transmission operation state to the reception operation state, the switching control unit determines whether a value of current flowing from the power supply unit to the compensation device is smaller than a predetermined value after causing the first switch unit to switch from the transmission connection state to the reception connection state and then causing the second switch unit to switch from the first state to the second state, and when the switching control unit determines that the value of current is not smaller than the predetermined value after lapse of predetermined time since the switching control unit causes the second switch unit to switch to the second state, the switching control unit determines that fault occurs.

* * * * *